United States Patent [19]

Okuda et al.

[11] 3,742,326
[45] June 26, 1973

[54] DIGITAL SERVO-MECHANISM

[75] Inventors: Nobuo Okuda, Masahiko Sekiguchi, both of Yokohama, both of Japan

[73] Assignee: Tokyo Shibaura Electric Company, Ltd., Kawasaki-shi, Japan

[22] Filed: Sept. 16, 1971

[21] Appl. No.: 181,172

[30] Foreign Application Priority Data
Sept. 16, 1970 Japan.............................. 45/80458
Sept. 16, 1970 Japan.............................. 45/80459
Oct. 21, 1970 Japan.............................. 45/91972
Dec. 11, 1970 Japan.............................. 45/109713
Dec. 11, 1970 Japan.............................. 45/109715

[52] U.S. Cl................. 318/603, 318/606, 318/601, 318/599
[51] Int. Cl. .......................................... G05b 19/28
[58] Field of Search................... 318/603, 606, 600, 318/601, 602, 599

[56] References Cited
UNITED STATES PATENTS
3,175,138  3/1965  Kilroy et al..................... 318/604 X
2,849,668  8/1958  Tripp............................. 318/605 X
3,523,231  8/1970  Arthur et al.................... 318/603 X Primary Examiner—Benjamin Dobeck
Attorney—Norman F. Oblon, Marvin J. Spivak et al.

[57] ABSTRACT

A digital servo-mechanism for controlling a frequency controlled two-phase servo-motor is provided. Instruction pulses for moving the servo-motor, by rotating the same through an angle proportional to the number of the instruction pulses, are fed to the servo-mechanism. A position angle detector, such as a synchro-resolver, detects the rotation angle of the servo-motor and produces feedback pulses proportional to the rotated angle of the servo-motor. Any deviation between the instruction pulses and the feedback pulses is converted into sine and cosine waves whose frequency is proportional to the deviation. The servo-motor is controlled by the sine and cosine waves.

7 Claims, 15 Drawing Figures

DIGITAL SERVO-MECHANISM

BACKGROUND OF THE INVENTION

1. Field of the Invention

This invention relates generally to a digital servo-mechanism, and more particularly to a digital servo-mechanism in which the servo-motor thereof is controlled by sine and cosine waves, the frequency of which is variable and which is generated by a digital circuit.

2. Description of the Prior Art

In the past, it has been well known to use a two-phase servo-motor in a servo-mechanism system. The two-phase servo-motor has an excitation winding and a control winding, and is operated by flowing a first alternating current through the excitation winding and simultaneously flowing a second alternating current, differing 90° in phase from the first alternating current, through the control winding. It is also well known that there are two methods for controlling the speed of the servo-motor. One method is voltage control, and the other is frequency control.

The voltage control method of controlling the speed of the servo-motor is done by flowing an alternating current of a constant voltage and of a constant frequency through an excitation winding, and flowing an alternating current of the same frequency and of a variable voltage through the control winding. The speed of rotation of the servo-motor is then controlled by varying the variable voltage being supplied to the control winding. One problem in the voltage control method is that the constant current always flows through the excitation winding even if the servo-motor does not rotate so that the efficiency thereof is very low. Furthermore, since the voltage supplied to the two windings are not the same, an elliptic rotating magnetic field is induced, and harmonics are thereby generated.

In view of the foregoing, the frequency control method of controlling the speed of the servo-motor has been found to be preferable. One problem here, however, is that it is difficult to obtain a variable frequency supply. Recently, with the wide usage of numerical control devices for machine tools and the like, it has become even more difficult to provide a variable frequency supply in that a digital operation is required.

SUMMARY OF THE INVENTION

Accordingly, it is one object of the present invention to provide a new and improved unique digital servo-mechanism.

It is another object of the present invention to provide a new and improved unique digital servo-mechanism in which a two-phase servo-motor is controlled by an alternating current having a variable frequency.

It is one other object of the present invention to provide a new and improved unique digital servo-mechanism in which a variable frequency supply is provided by a digital operation.

It is still another object of the present invention to provide a new and improved unique digital servo-mechanism in which an alternating current having a variable frequency is modulated into a PWM signal.

One further object of the present invention is to provide a new and improved unique digital servo-mechanism in which the waveforms of the current flowing through the windings of the servo-motor are satisfactorily shaped.

Briefly, in accordance with the present invention, these and other objects are obtained, in one aspect, by providing a two-phase servo-motor having an excitation and a control winding. A position detector is also provided for detecting the angular position of the servo-motor and for generating feedback pulses, the number of which is proportional to the angular position. Instruction pulses are fed to move the servo-motor by an angle of rotation which is proportional to the number of the instruction pulses. A deviation register is also provided to count the feedback pulses and the instruction pulses. A gate circuit is provided to multiply the contents of the deviation register with reference pulses generated by a pulse generator to thereby generate a successive pulse train. A pulse counter is provided to count the successive pulse train and to convert the deviation into a frequency signal. Sine and cosine waves are generated in accordance with the frequency of a function generator. A power amplifier is provided for amplifying the sine and cosine waves to thereby drive the exciting and control windings of the servo-motor.

BRIEF DESCRIPTION OF THE DRAWINGS

A more complete appreciation of the invention will be readily obtained as the same becomes better understood by reference to the following detailed description when considered in connection with the accompanying Drawings, wherein:

FIG. 14 is a block diagram of still one other preferred embodiment of a digital servo-mechanism according to this invention; and, FIG. 15 shows the frequency characteristics of the power amplifier of FIG. 6.

DETAILED DESCRIPTION OF THE PREFERRED EMBODIMENTS

Figure 1:
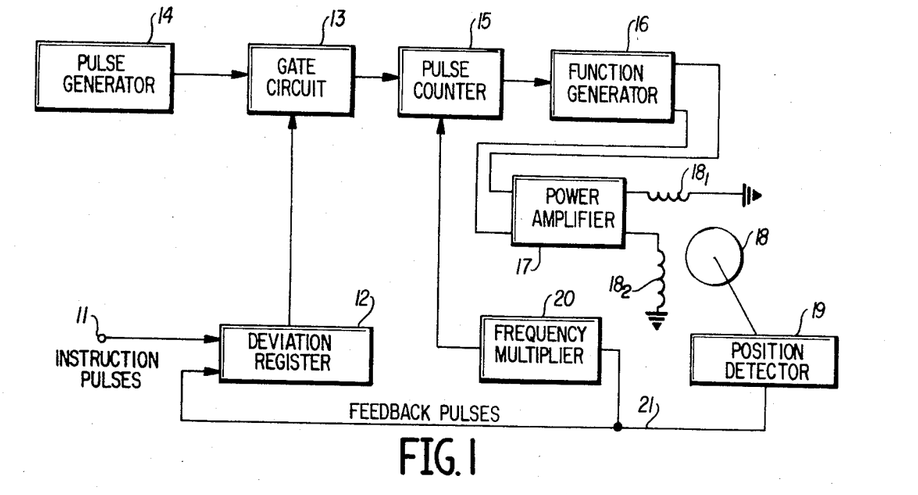
FIG. 1 is a block diagram of one preferred embodiment of a digital servo-mechanism according to the present invention.

Referring now to the drawings wherein like reference numerals designate identical, or corresponding parts throughout the several views, and more particularly to FIG. 1 thereof wherein a digital servo-mechanism according to the present invention is shown as having instruction pulses 11 which are fed to a deviation register 12. The instruction pulses 11 are employed to move a two-phase servo-motor 18 by rotating the same through an angle proportional to the number of the pulses 11. The angle of rotation of the servo-motor 18 is detected by a position detector 19, such as a synchro-resolver, which converts the angle of rotation into a train of feedback pulses 21, and then transmits the same to the deviation register 12. The deviation register 12 is employed as a reversible counter, and counts up and down the instruction pulses 11 and the feedback pulses 21 and registers the deviation between them. The deviation is then transmitted to a gate circuit 13.

A pulse generator 14 is provided, and transmits a train of reference pulses to the gate circuit 13. The gate circuit 13 multiplies the reference pulses with the deviation output of the deviation register 12 and thereby converts the deviation into a successive pulse train, the number of pulses of which is proportional to the deviation.

The successive pulse train so generated is then fed to a pulse counter 15. The pulse counter 15 counts up the pulses from 0 to a certain number at which time an output pulse is emitted and then counts down to 0 at which time another output pulse is emitted. The frequency of the output pulses of the pulse counter 15 is thereby proportional to the content of the deviation register 12. The feedback pulses 21 are fed to the pulse counter 15 through a frequency multiplier 20 to thereby provide a speed feedback loop. The output of the pulse counter 15 is fed to a function generator 16.

The function generator 16 generates a sine wave and a cosine wave according to the frequency defined by the pulse counter 15, and the sine and the cosine waves are then amplified by a power amplifier 17. The outputs of the power amplifier 17 are then fed to an exciting winding $18_1$ and a control winding $18_2$ to thereby control the speed of the servo-motor 18.

It should be understood that if the instruction pulses 11 have a plus sign and are to rotate the servo-motor 18 in the forward direction, then the instruction pulses 11 will be counted up by the deviation register 12 to thereby cause the servo-motor 18 to rotate in the forward direction. The position detector 19 will detect the rotation of the servo-motor 18 and will transmit feedback pulses 21 which have a minus sign. The deviation register 12 will subtract the feedback pulses 21 from its content, and when the same becomes 0, the servo-motor 18 will stop. In accordance with the above, it is apparent that the servo-motor 18 can rotate by an angle of rotation designated by the instruction pulses 11. If the servo-motor 18 were to rotate in the reverse direction, the instruction pulses 11 would have a minus sign, and the feedback pulses 21 would then have a plus sign.

The details of each portion of the embodiment set forth in FIG. 1 will be described hereinafter.

Figure 2:
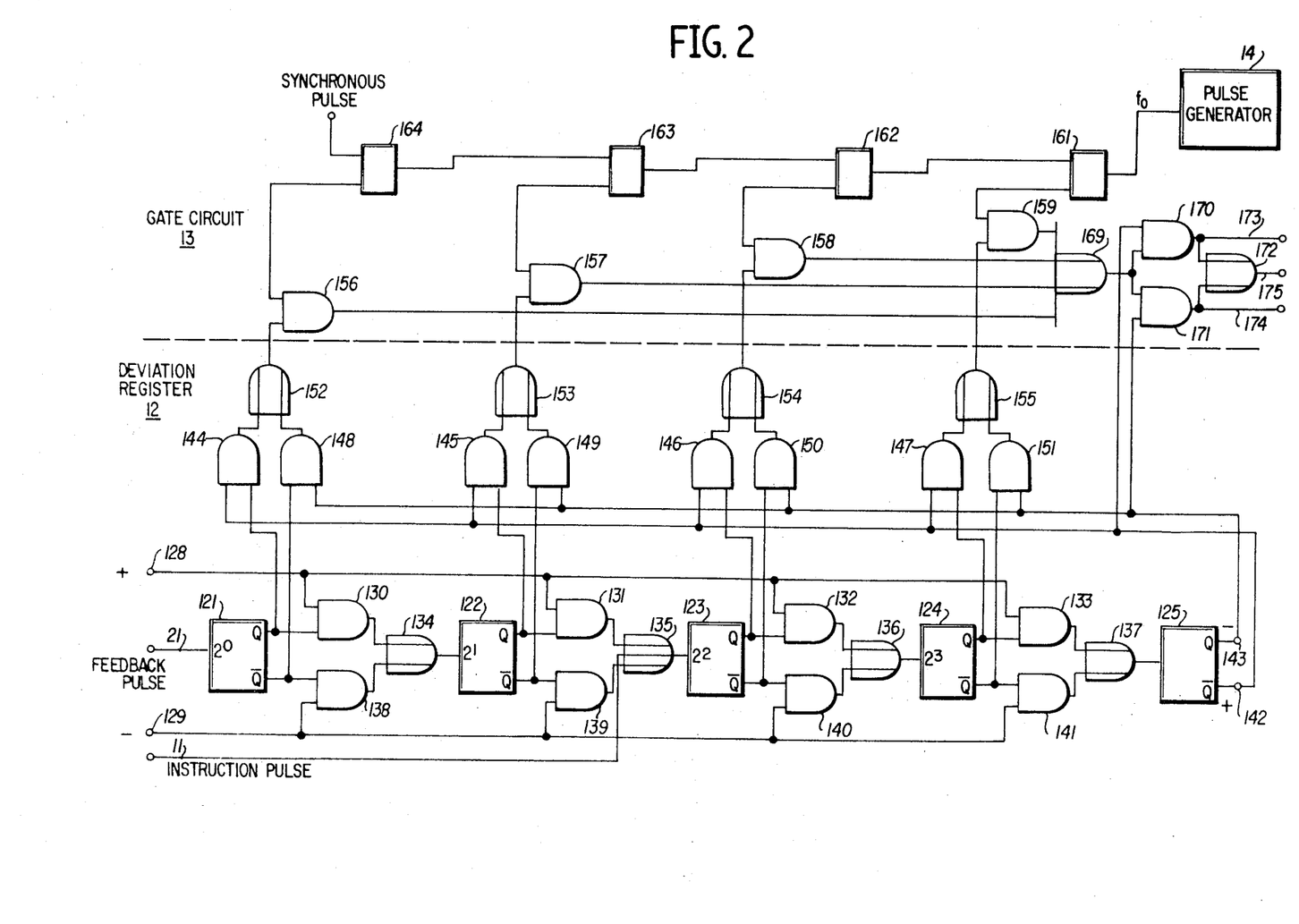
FIG. 2 is a logic diagram of a deviation register, a pulse generator and a gate circuit for a digital servo-mechanism according to the present invention.

FIG. 2 shows a logic diagram of the deviation register 12, the gate circuit 13, and the pulse generator 14. In this embodiment, the deviation register 12 contains five flip-flops 121 through 125 to thereby constitute a binary counter. If the content of each of the flip-flops 121 through 125 is 0, then the output Q of each of the flip-flops will be 0 and the output $\overline{Q}$ will be 1, and if the content is 1, the output Q will be 1 and the output $\overline{Q}$ will be 0. The flip-flops 121 through 124 are utilized to designate the magnitude of the deviation, and the flip-flop 125 is utilized to designate the sign of the deviation. The outputs $\overline{Q}$ of each of the flip-flops 121 through 124 are fed to AND gates 130 through 133, respectively. The outputs Q of each of the flip-flops 121 through 124 are fed to AND gates 138 through 141, respectively. OR gates 134 through 137 are provided, and are fed input pulses from the AND gates 130 and 138, the AND gates 132 and 140, and the AND gates 133 and 141, respectively. The output pulses of each of the OR gates 134 through 137 are fed to the flip-flops 122 through 125, respectively.

The instruction pulses 11 are fed to the OR gate 135. Each one of the instruction pulses 11 is employed to move the servo-motor 18 by a given angle of rotation, such as 3°. The feedback pulses 21 are fed to the flip-flop 121. The feed back pulses 21 are transmitted from the position detector 19 when the servo-motor 18 moves 3°/4 of the angle of rotation. In addition, there are provided plus sign pulses 128 and minus sign pulses 129. The plus sign pulses 128 are fed to the AND gates 130 through 133, and the minus sign pulses 129 are fed to the AND gates 138 through 141.

The flip-flop 121 alternatively changes its state from 0 to 1 or from 1 to 0 in response to the arriving of the feedback pulses 21. The flip-flop 122 also alternatively changes its state when the output Q of the flip-flop 121 changes from 1 to 0 in the presence of a plus sign signal 128, or when the output $\overline{Q}$ changes from 1 to 0 in the presence of a minus sign signal 129. The other flip-flops 123 through 125 operate in the same manner as the flip-flop 122. The flip-flop 123, however, will also change its state in response to the presence of the instruction pulses 11.

The outputs Q of each of the flip-flops 121 through 124 are also fed to AND gates 144 through 147, respectively. The outputs $\overline{Q}$ of each of the flip-flops 121 through 124 are also fed to AND gates 148 through 151, respectively. The output $\overline{Q}$ of the flip-flop 125 is simultaneously fed to the AND gates 148 through 151. The output Q of the flip-flop 125 is simultaneously fed to the AND gates 144 through 147. The outputs of the AND gates 144 and 148 are fed to an OR gate 152. The outputs of the AND gates 145 and 149 are fed to an OR gate 153. The outputs of the AND gates 146 and 150 are fed to an OR gate 154. The outputs of the AND gates 147 and 151 are fed to an OR gate 155. The outputs of the OR gates 152 through 155 are hereinafter referred to as the content of the deviation register 12.

As described before, the flip-flop 125 serves to designate the sign of the deviation, and if the output $\overline{Q}$ thereof is 1, it serves to designate a plus sign, and if the output Q thereof is 1, it serves to designate a minus sign. Now, it should be understood that when the output Q of the flip-flop is 1, the AND gates 148 through 151 will open and the content of the deviation register 12 will be designated by the outputs $\overline{Q}$ of the flip-flops 121 through 124 and that when the output $\overline{Q}$ of the flip-flop 125 is 1, the AND gates 144 through 147 will open and the content of the deviation register 12 will be designated by the output Q of the flip-flops 121 through 124. The relationship between the content of the deviation register 12 and the flip-flops 121 through 125 is shown in Table 1.

TABLE 1

| The content of | Flip- | Flip- | Flip- | Flip- | Flip-Flop |

| the deviation register | Flop 121 | Flop 122 | Flop 123 | Flop 124 | 125 the sign |
|---|---|---|---|---|---|
| +15 | 1 | 1 | 1 | 1 | 0 |
| +14 | 0 | 1 | 1 | 1 | 0 |
| ⋮ | ⋮ | ⋮ | ⋮ | ⋮ | ⋮ |
| +3 | 1 | 1 | 0 | 0 | 0 |
| +2 | 0 | 1 | 0 | 0 | 0 |
| +1 | 1 | 0 | 0 | 0 | 0 |
| 0 | 0 | 0 | 0 | 0 | 0 |
| −1 | 0 | 1 | 1 | 1 | 1 |
| −2 | 1 | 0 | 1 | 1 | 1 |
| −3 | 0 | 0 | 1 | 1 | 1 |
| ⋮ | ⋮ | ⋮ | ⋮ | ⋮ | ⋮ |
| −15 | 0 | 0 | 0 | 0 | 1 |

In the above Table 1, it is seen that in the described embodiment a maximum count over +15 or below −15 cannot be provided. Obviously, it can be easily understood that this problem can be avoided by providing more flip-flops. Furthermore, in the deviation register 12 shown in FIG. 2, when the content of the deviation register 12 is "00000" and the feedback pulses 21 and the minus sign signal 129 arrive, the flip-flops will change to "11111", and thus unpreferably the content of the deviation register 12 will still be 0. Accordingly, if the content of the flip-flop 125 changes from 1 to 0, the deviation register 12 must subtract a 1 from its content so as to become "01111" or −1.

In the above construction of the deviation register 12, the operation is as follows.

As beforementioned, the instruction pulses 21 are employed to move the servo-motor 18, and if it is desired to move the servo-motor 18 in the forward direction, the plus sign pulses 128 are also fed with the instruction pulses 11. The binary counter will then count up the instruction pulses 11 so that the servo-motor 18 will rotate in a forward direction according to the deviation. The position detector 19 will then detect the angular position of the servo-motor 18 and transmit corresponding feedback pulses 21 with a minus sign pulse 129 in order to enable a subtraction from the content of the flip-flop binary counter. When the content of the binary counter or the deviation register 12 becomes 0, the servo-motor 18 will stop. Now, if it is desired to move the servo-motor 18 in a reverse direction, the instruction pulses 11 with minus sign pulses 129 are fed. The binary counter will then count down the instruction pulses 11, so that the servo-motor 18 will rotate in a reverse direction according to the deviation. The position detector 19 will then detect the angular position of the servo-motor 18 and transmit the corresponding feedback pulses 21 with a plus sign pulse 128 to enable an addition to the content of the flip-flop binary counter. When the content of the binary counter or the deviation register 12 becomes 0, the servo-motor 18 will stop.

Figure 3:
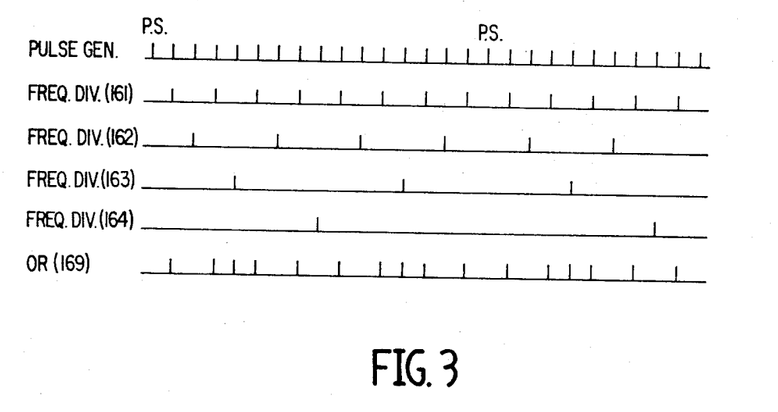
FIG. 3 is a chart illustrating the pulse sequence provided by the pulse generator and the gate circuit of the digital servo-mechanism according to the present invention.

Referring now to FIG. 3, a chart illustrating the pulse sequence for explaining the pulse generator 14 and the gate circuit 13 of FIG. 2 is therein set forth. The pulse generator 14 generates a reference pulse train as shown in FIG. 3. Every 16th pulse, a synchronizing pulse is employed. The reference pulse train is then serially fed to frequency dividers, such as flip-flops 161 through 164, and is divided as shown in FIG. 3. The outputs of each of the frequency dividers 161 through 164 are fed to AND gates 156 through 159, respectively. The other input to the AND gates 156 through 159 are fed from the OR gates 152 through 155, respectively. The output pulses of the AND gates 156 through 159 are fed through an OR gate 169 to AND gates 170 and 171. The other input to the AND gates 170 and 171 are the outputs $\bar{Q}$ and Q of the flip-flop 125, respectively. An output of the AND gate 170, which hereinafter will be referred to as the add command pulse 173, is fed to the pulse counter 15, and also to an OR gate 172. An output of the AND gate 171, which hereinafter will be referred to as the subtract command pulse 174, is fed to the pulse counter 15, and also to the OR gate 172.

As described before, the outputs of OR gates 152 through 155 designate the content of the deviation register 12 in binary code, and each output corresponds to the decimal code number 1,2,4 and 8. The frequency dividers 164 through 161 feed 1,2,4 and 8 pulses, respectively, to AND gates 156 through 159 in each time cycle of the pulse generator 14. The number of output pulses of the OR gate 169 within each cycle time is therefore equal to the content of the deviation register 12. In FIG. 3, the case is shown, by example, wherein the content of the deviation register 12 is 1010 in binary code or 10 in decimal code. Accordingly, as the pulse generator 14 serially generates the reference pulses, the output pulses of the OR gate 169 will become a successive pulse train and the number of which arrive within a certain time range is nearly proportional to the content of the deviation register 12 even if the content therein is varied.

Also, if the content of the deviation register 12 has a plus sign, then the AND gate 170 will open and add command pulses 173 are fed to the pulse counter 15 with the successive pulse train 175. If the content of the deviation register 12 has a minus sign, then the AND gate 171 will open and subtract command pulses 174 are fed to the pulse counter 15.

Figure 4:
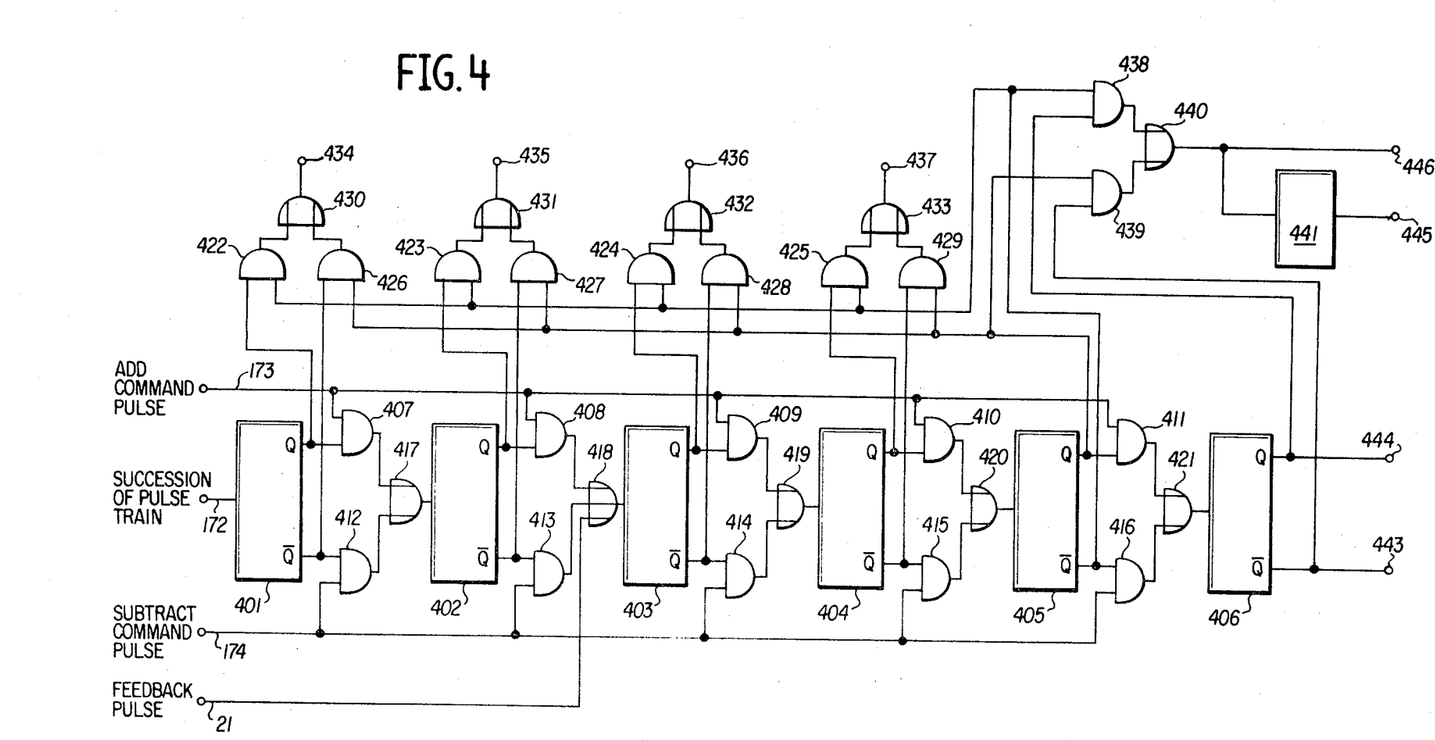
FIG. 4 is a logic diagram of a pulse counter of a digital servo-mechanism according to the present invention.

FIG. 4 is a block diagram of the pulse counter 15, and it is seen that the same closely resembles the deviation register 12 of FIG. 2. Flip-flops 401 through 405 correspond to the flip-flops 121 through 125. AND gates 407 through 410 and 412 through 415 correspond to the AND gates 130 through 133 and 138 through 141, and OR gates 417 through 420 correspond to the OR gates 134 through 137. The feedback pulses 21, the plus sign pulses 128, the minus sign pulses 129 and the instruction pulses 11 in FIG. 2 correspond to the successive pulse train 172, the add command pulses 173, the subtract command pulses 174 and the feedback pulses 21 in FIG. 4, respectively. Furthermore, AND gates 422 through 429 correspond to the AND gates 144 through 151, and OR gates 430 through 433 correspond to the OR gates 152 through 155. The connection of above elements in FIG. 4 is the same as that of FIG. 2. Outputs 434 through 437 of the OR gates 430 through 433 or the content of the pulse counter 15 is fed to the function generator 16. The output Q of the flip-flop 405 is fed to AND gates 411 and 439, and the output $\bar{Q}$ is fed to AND gates 416 and 438. The outputs of the AND gates 411 and 416 are fed to the flip-flop 406 through an OR gate 421. The output $\bar{Q}$ 443 of the flip-flop 406 is fed to the AND gate 439. The output Q 444 of the flip-flop 406 is fed to the AND gate 438. The outputs of the AND gates 438 and 439 are fed to an OR gate 440, and the output 446 of the OR gate 440 is fed to an inverter 441 which provides the output 445.

In FIG. 1, the feedback pulses 21 were fed to the pulse counter 15 through the frequency multiplier 20, while in FIG. 4, the feedback pulses 21 are fed to the flipflop 403, such that the feedback pulses 21 are multiplied four times as compared to the successive pulse train 172. As such, the frequency multiplier 20 is not provided here because the feedback pulse 21 is substantially multiplied four times by feeding the feedback pulse 21 to the third stage of the counter 15. Of course it can be easily understood that the same effect can be obtained by providing the frequency multiplier 20 to multiply the feedback pulse 21 four times and then feeding the output of the frequency multiplier 20 to the first stage (flipflop 401) of the counter 15. The reason why the feedback pulses 21 are fed to the pulse counter 15 is to provide a speed feedback loop. That is to say, it is preferable not to rotate the servo-motor 18 too fast. The feedback pluses 21 will subtract from the content of the pulse counter 15 and the speed of the servo-motor 18 will thereby be reduced. In this embodiment, the feedback pulses 21 are multiplied four times to stabilize the feedback loop. Also, it should be understood that the coefficient of the multiplier is decided only by the stability of the speed feedback loop, so the coefficient of the multiplier is not limited to a factor of four times.

In the above connection, the flip-flops 401 through 404 are utilized to count up the successive pulse train 172, and the flip-flops 405 and 406 are utilized to designate the frequency of sine and cosine waves which are to control the servo-motor 18. To briefly explain the pulse counter 15, the case wherein only add command pulses 173 and the successive pulse train 172 are fed to the pulse counter 15 will be hereinafter described.

Table 2 is provided to explain the pulse counter 15 for the case wherein the successive pulse train 172 and the add command pulses 173 are fed.

1  1  1  1  1  0     0

TABLE 2

| FF 401 | FF 402 | FF 403 | FF 404 | FF 405 | FF 406 | Content of Pulse Counter |
|---|---|---|---|---|---|---|
| 0 | 0 | 0 | 0 | 0 | 0 | 0 |
| 1 | 0 | 0 | 0 | 0 | 0 | 1 |
| 0 | 1 | 0 | 0 | 0 | 0 | 2 |
| 1 | 1 | 0 | 0 | 0 | 0 | 3 |
| : | : | : | : | : | : | : |
| 1 | 0 | 1 | 1 | 0 | 0 | 13 |
| 0 | 1 | 1 | 1 | 0 | 0 | 14 |
| 1 | 1 | 1 | 1 | 0 | 0 | 15 |
| 0 | 0 | 0 | 0 | 1 | 0 | 15 |
| 1 | 0 | 0 | 0 | 1 | 0 | 14 |
| : | : | : | : | : | : | : |
| 1 | 1 | 1 | 1 | 1 | 0 | 0 |
| 0 | 0 | 0 | 0 | 0 | 1 | 0 |
| 1 | 0 | 0 | 0 | 0 | 1 | 1 |
| : | : | : | : | : | : | : |
| 1 | 1 | 1 | 1 | 0 | 1 | 15 |
| 0 | 0 | 0 | 0 | 1 | 1 | 15 |
| : | : | : | : | : | : | : |
| 1 | 1 | 1 | 1 | 1 | 1 | 0 |
| 0 | 0 | 0 | 0 | 0 | 0 | 0 |
| : | : | : | : | : | : | : |

At first, the flip-flops 401 through 406 are all set to 0. Then, the first 15 pulses of the successive pulse train 172 are counted up by the flip-flops 401 through 404, and in this case, the AND gates 442 through 425 are opened and the content of the pulse counter 15 will change from 0 to 15 in decimal code. Then, the next 16 pulses of the successive pulse train are counted up by the flip-flops 401 through 404 from 0 to 15, but in this case the flip-flop 405 becomes 1, and so the AND gates 426 through 429 are opened and the outputs 434 through 437 will change from 15 to 0 in decimal code. It is thus seen that the content of the pulse counter 15 alternatively changes its content from 0 to 15, and then from 15 to 0 in response to the arrival of the successive pulse train.

Figure 5:
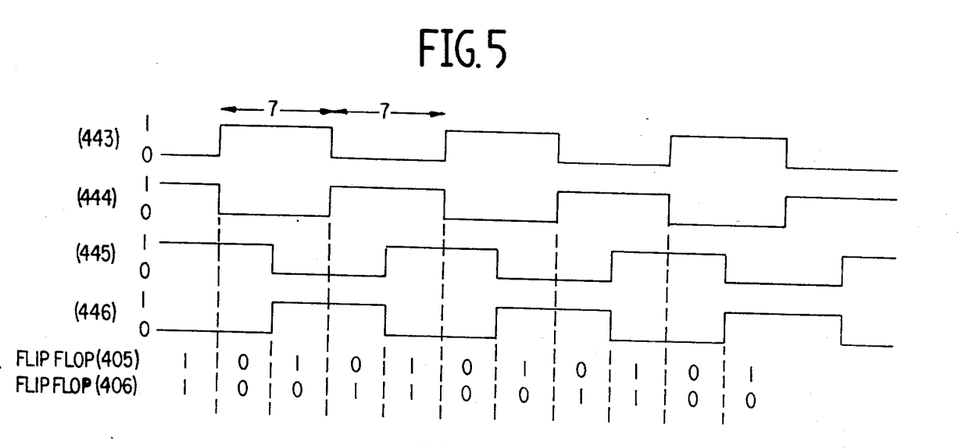
FIG. 5 is a time chart to explain the pulse counter.

The relationship between the outputs 443 through 446 and the flip-flops 405 and 406 are shown in FIG. 5. Since the flip-flop 406 changes its state every 32 pulses of the successive pulse train 172, the pulse interval $\tau$ of the output 443 is equal to the time that it takes to count up the successive pulse train 172 from 0 to 15 and then to count down to 0. And since, as described before, the number of the successive pulse trains is proportional to the deviation, the pulse interval $\tau$ of the output 443 is also proportional to the deviation and is used as the frequency of the sine wave. The output 444 has a sign opposite to the output 443, and the output 445 is ¼ $\tau$ ahead of the output 443, so the output 445 is used as the frequency of the cosine wave. The output 446 has a sign opposite to that of the output 445.

Figure 6:
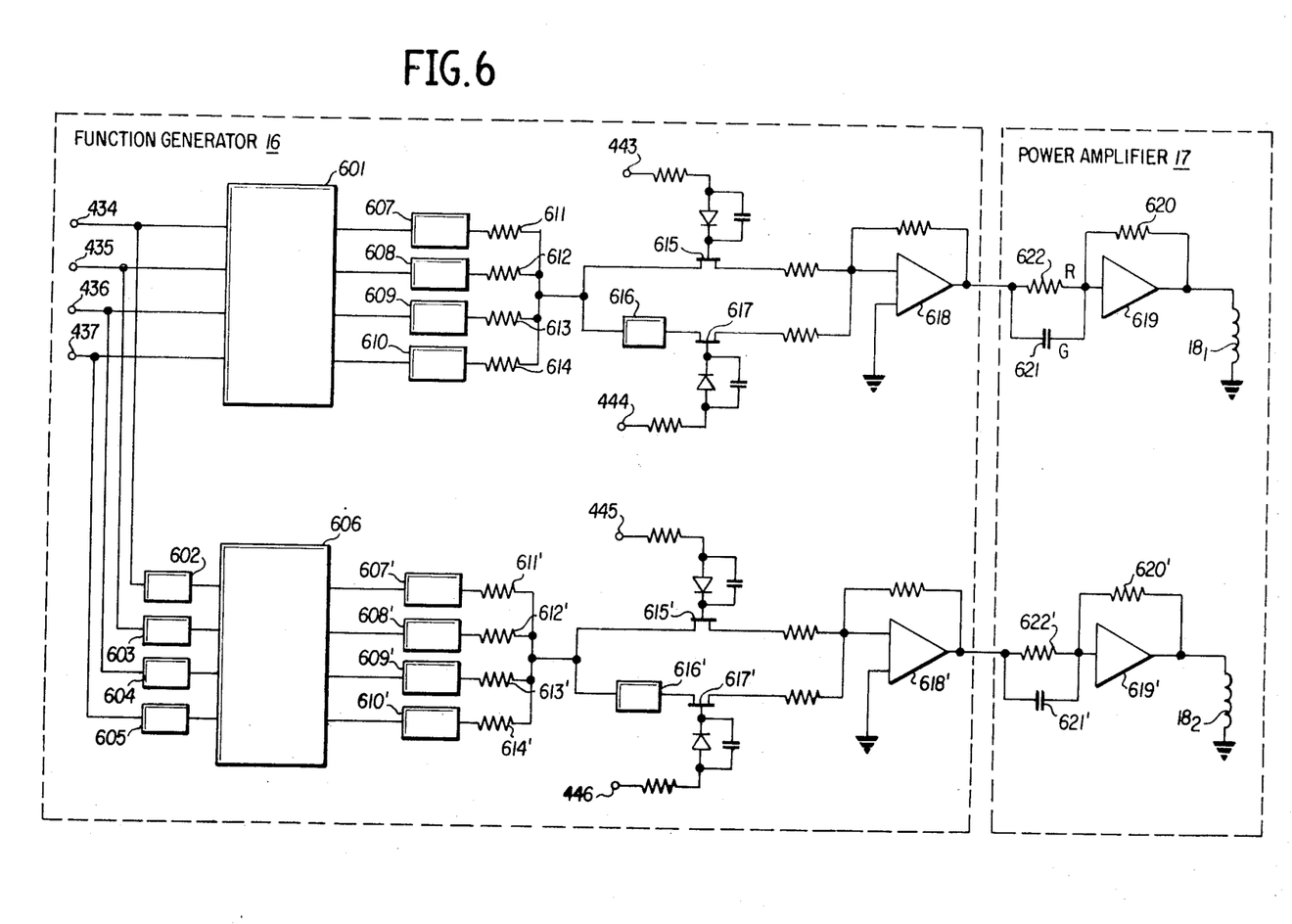
FIG. 6 is a block diagram of a function generator and a power amplifier of one preferred embodiment of a digital servo-mechanism according to this invention.

FIG. 6 shows a block diagram of the function generator 16 and the power amplifier 17. The content of the pulse counter 15, or the outputs 434 through 437 are fed to a fixed memory 601, and are also fed to a fixed memory 606 through inverters 602 through 605. The fixed memory 601 transforms the content of the pulse counter 15 into a corresponding amplitude for the sine wave. In other words, one-fourth of the sine wave is divided into 16 portions, and the fixed memory 601 memorizes the amplitudes of the sine wave corresponding to the 16 portions. Now, if the content of the pulse counter 15 designates a certain portion of the sine wave, then the fixed memory 601 will transform the same into the corresponding amplitude in binary code, and then transmits it to pulse amplifiers 607 through 610 and then to resistors 611 through 614.

The resistors 611 through 614 are connected to an analogue gate 615, and also to an analogue gate 617 through an inverter 616. The analogue gates 615 and 617 are connected to an operational amplifier 618. The resistors 611 through 614 and the operational amplifier 618 operate as a D-A converter. The gate signal for the analogue gate 615 is the output 443 of the flip-flop 406, and the gate signal for the analogue gate 617 is the output 444. The resistance of the resistor 614 is two times larger than that of the resistor 613, which is two times larger than that of the resistor 613, which is two times larger than that of the resistor 612, which, in turn, is two times larger than the resistance of the resistor 611. Thus, although the output of the fixed memory 601 is designated in binary code, it can be converted into an analogue value by the resistors 611 through 614 and the operational amplifier 618.

Figure 7:
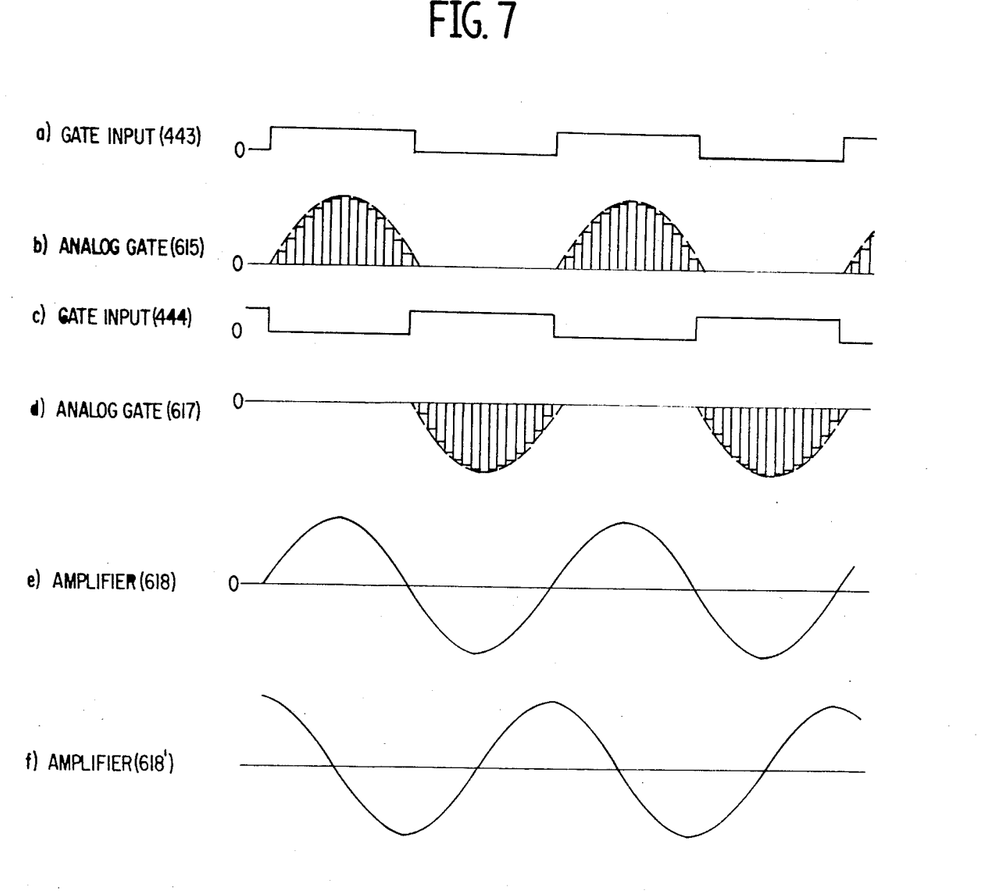
FIG. 7 is a time chart to explain the function generator.

As described above in connection with FIG. 4, the content of the pulse counter 15 alternatively changes from 0 to 15 and then from 15 to 0. During the first cycle of the changing of the content from 0 to 15 and then from 15 to 0, the gate signal 443 is 1, so the analogue gate 615 opens, and during the next cycle, the gate signal 444 is 1, so the analogue gate 617 opens. The output waveforms of the analogue gates 615 and 617 are shown in FIG. 7, and the same are added by the operational amplifier 618 so the output of the operational amplifier 618 becomes the sine wave, whose frequency is proportional to the deviation.

The fixed memory 606 memorizes the amplitudes of one-fourth of a cosine wave divided into 16 portions. The other elements connected to the fixed memory 606 are all the same as those connected to the fixed memory 601. The numerals 607' through 618' correspond to the numerals 607 through 618, respectively. The gate signals fed to the analogue gate 615' and 617' are the output 445 and 446. Thus, the output of the operational amplifier 618' is the cosine wave shown in FIG. 7, whose frequency is also proportional to the deviation.

The sine wave generated in the function generator 16 is fed to the power amplifier 17. If the output of the amplifier 618 is fed to the exciting winding $18_1$ of the servo-motor 18, the supplied voltage will be constant in value and variable in frequency. However, since the impedance of the winding $18_1$ changes in response to frequency, the current flowing through the winding $18_1$ will increase as the frequency decreases. Thus, in order to avoid a burning of the winding, it is necessary to provide means for controlling the current therethrough.

Figures 14, 15:
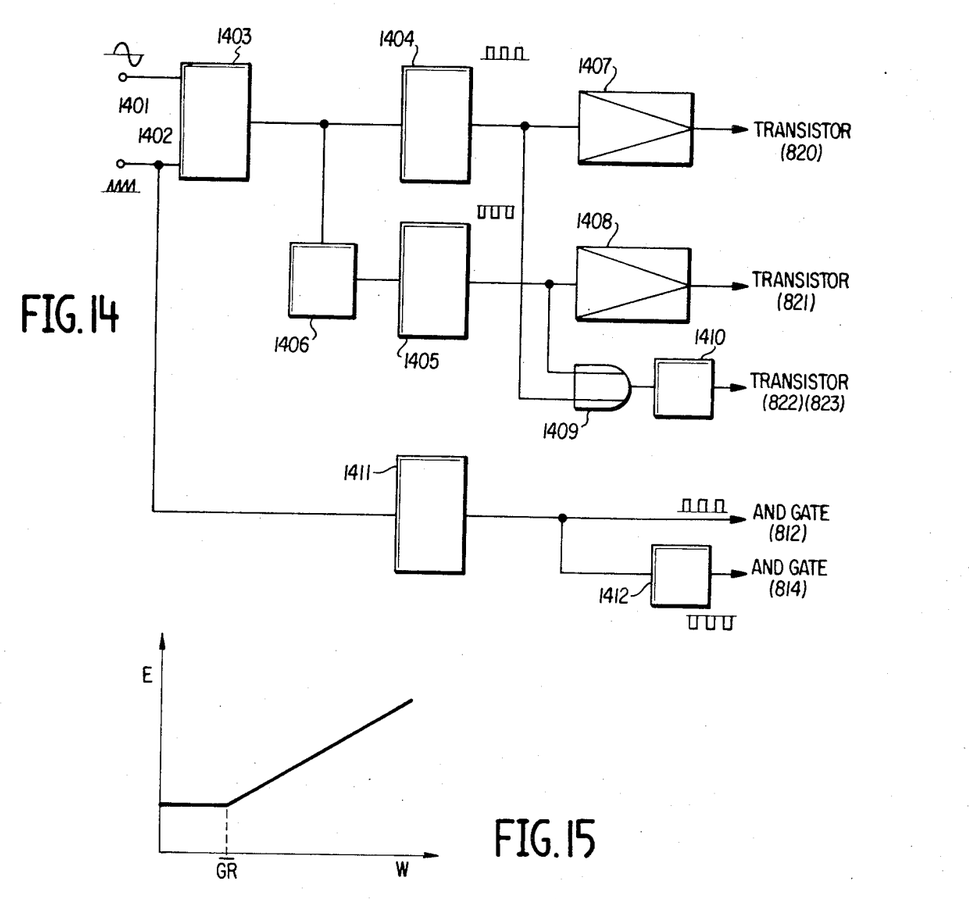

The power amplifier 17 comprises an operational amplifier 619, a feedback register 620, and an input impedance which is the parallel connection of a capacitor 621 and a resistor 622. The frequency characteristics of the power amplifier are shown in FIG. 15. In FIG. 15 it is seen that the output voltage E of the power amplifier is nearly constant until the frequency increases to a certain value, at which time the voltage will increase as the frequency increases. Accordingly, as the impedance of the exciting winding $18_1$ increases as the frequency increases, the current flowing through the winding $18_1$ will remain at a nearly constant value.

As abovementioned, according to the present invention, the instruction pulses 11 will move the servo-motor 18 by an angle of rotation proportional to the number of instruction pulses 11 counted by the deviation register 12, which deviation is converted to sine and cosine waves, whose frequency is proportional to the deviation. Thus, the speed control for the servo-motor 18 is made by the sine and the cosine waves. The angle of rotation of the servo-motor 18 is detected by the position detector 19 and the feedback pulses 21 are fed to the deviation register 12. When the deviation becomes 0, the servo-motor will stop, after the rotation of a predetermined angle. Therefore, it can be easily understood that the servo-motor 18 can be controlled by the sine and the cosine waves which are generated by a digital operation and whose frequency is variable.

It should be understood that in the above embodiments, the converted sine wave is directly amplified. Since power amplifiers are generally not suitable for amplifying a sine wave, it is more efficient to effect pulse width modulation (PWM) for the sine wave. This enables a power amplifier to be utilized which is suitable for amplifying pulses.

Figure 8:
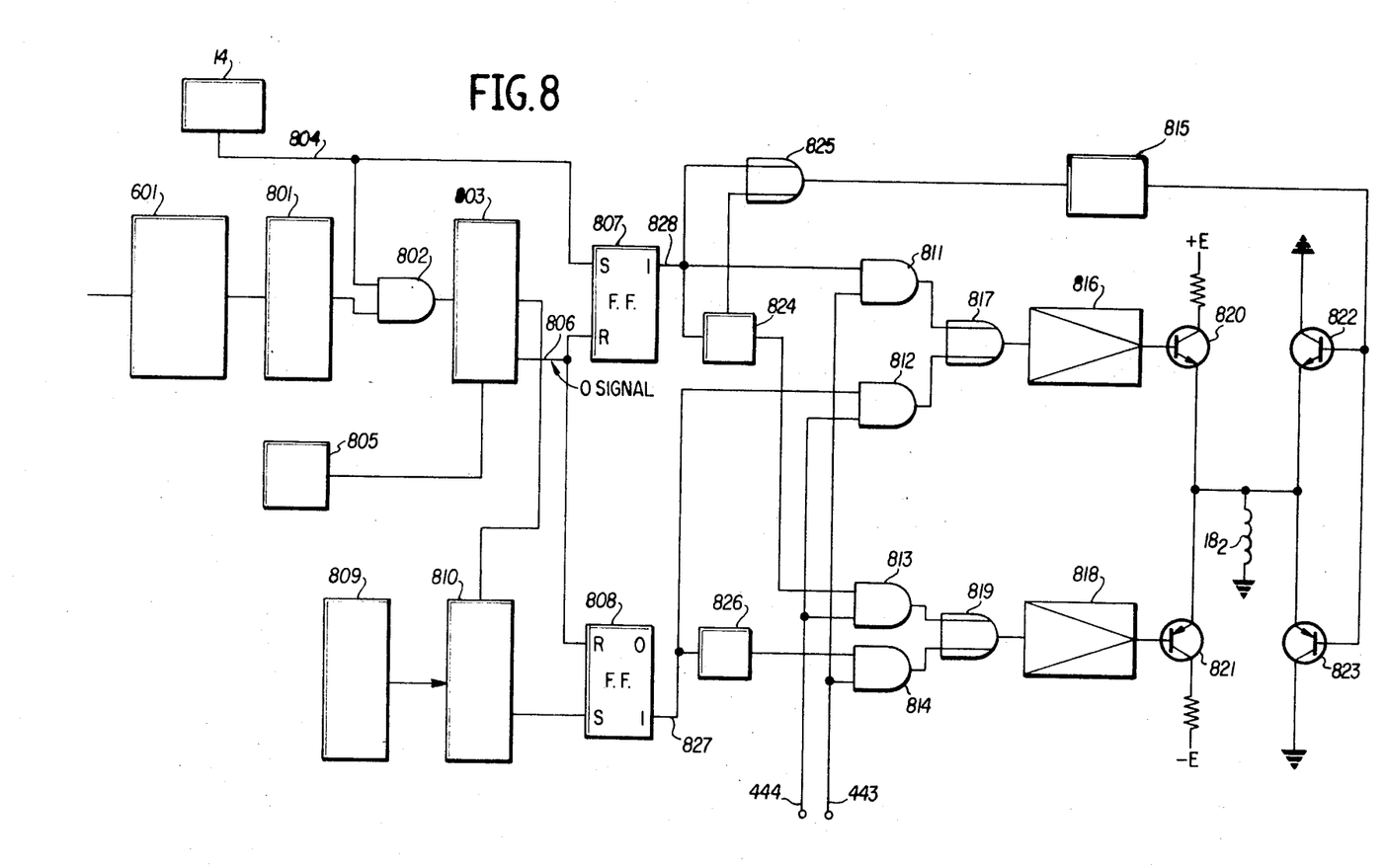
FIG. 8 is a block diagram of another preferred embodiment of a digital servo-mechanism according to this invention.

FIG. 8 is a block diagram of another embodiment of the present invention. The deviation register 12, the pulse generator 14, the gate circuit 13, the pulse counter 15 and the position detector 19 are the same as those shown in FIG. 1, and accordingly, are not shown in FIG. 8. Furthermore, in FIG. 8, only a sine wave amplifier circuit is shown, because a cosine wave amplifier circuit can be easily obtained once the details of the sine wave amplifier circuit are given.

The fixed memory 601 in FIG. 8 is the same as that shown in FIG. 6. The output signals of the fixed memory 601, or the binary codes representing the amplitude of a sine wave are fed to a register 801. The content of the register 801 is fed to a subtract counter 803 through an AND gate 802. The reference pulses generated by the pulse generator 14 are also fed to the AND gate 802 as a gate pulse 804. A clock pulse oscillator 805 is provided, and generates clock pulses, whose frequency is nearly $2^n$ times as great as that of the pulse generator 14. The $n$ is equal to the number of bits of the register 801. The content of the subtract counter 803 is subtracted by the clock pulses, and whenever the subtract counter 803 becomes 0 the clock pulses will be stopped by any suitable gate means (not shown), and a zero signal 806 will be fed to flip-flops 807 and 808 to reset them. The flip-flop 807 is set by the gate signal 804.

A memory 809, such as a register, is provided to memorize a constant value. The constant value of the memory 809 is coincided with the content of the subtract counter 806 by a coincidence circuit 810. An output from the coincidence circuit 810 will set the flip-flop 808.

The set output of the flip-flop 807 is fed to an AND gate 811 and also to an AND gate 813 through an inverter 824, and to an inverter 815 through an OR gate 825. The set output of the flip-flop 808 is fed to an AND gate 812 and also to an AND gate 814 through an inverter 826. The gate signal 443 shown in FIG. 6 is fed to the AND gates 811 and 814, and the gate signal 444 is fed to the AND gates 812 and 813. The outputs of AND gates 811 and 812 are amplified by the pulse amplifier 816 through an OR gate 817 and are then fed to a power transistor 820, such as of the NPN type. The outputs of the AND gates 813 and 814 are amplified by the pulse amplifier 818 through an OR gate 819 and are then fed to a power transistor 821, such as of the PNP type. The outputs of the inverter 815 are fed to transistors 822 and 823. The load of the transistors 820 and 821 is the exciting winding $18_1$.

The output of the fixed memory 601 or the amplitude at a point on a sine wave represented in binary code is fed to the register 801. The AND gate 802 will open for every reference pulse 804, and as such the content of the register 801 is shifted to the subtract counter 803. Also, the flip-flop 807 is set by the reference pulse 804. The subtract counter 803 counts down the clock pulses from its content and if it becomes 0, the zero signal 806 is transmitted to reset the flip-flop 807, so that the width of the output pulse or PWM signal 828 of the flip-flop 807 is directly proportional to the content of the fixed memory 601.

Figure 9:
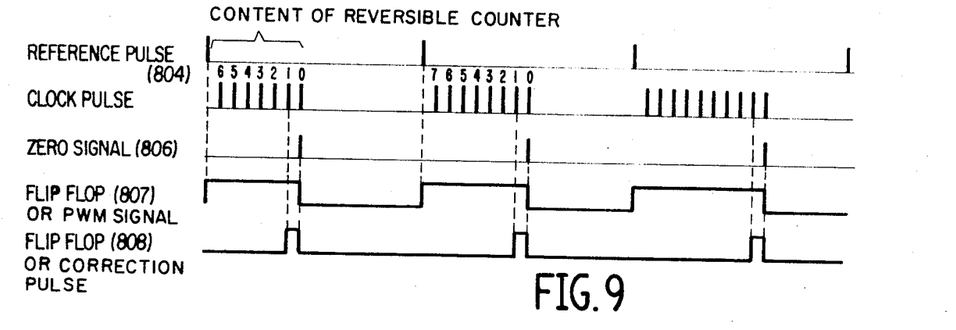
FIGS. 9 through 13 are time charts to explain the embodiment shown in FIG. 8.
Figure 10:
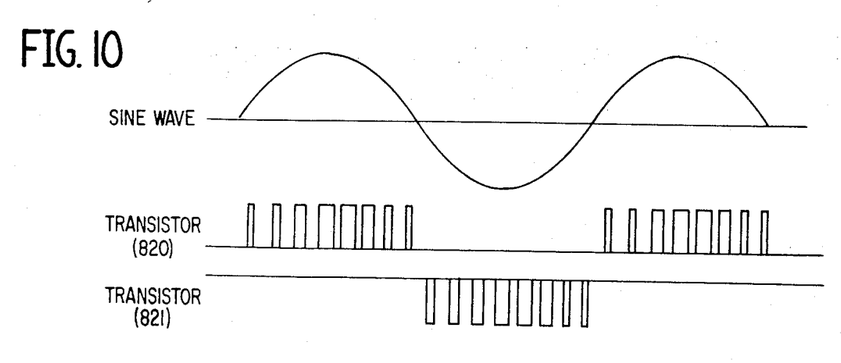

FIG. 9 is the time chart to explain the embodiment shown in FIG. 8. In FIG. 9, a situation is shown wherein the content of the fixed memory 601 or amplitude of the sine wave changes in response pulse 804. Now at first the content of the fixed memory is "7." The reference pulse 804 is fed to the AND gate 802 to shift the content of the register 801 to the reversible counter 803, and is also fed to the flipflop 807 to set it. This is shown in FIG. 9. Then clock pulses are also fed to the counter 803 to be subtracted from the contents thereof. Seven clock pulses are subtracted, and at last the content of the counter 803 becomes 0, then the zero signal 806 resets the flip-flop 807. Therefore, the output 828 of the flip-flop 807 becomes as shown in FIG. 9, and the width of the output 828 is proportional to "7." When the content of the fixed memory 601 becomes "8," the output 828 becomes as shown in FIG. 9, having a pulse width proportional to "8." Accordingly, the output 828 designates a PWM signal into which a sine wave is modulated. It will be readily understood, of course, that FIG. 9 explains the logical operation, while FIG. 10 shows the whole wave form of the PWM signal generated in the circuit shown in FIG. 8.

From the operation mentioned above a sine wave is modulated into PWM signals 828, which are fed to the AND gates 811 and 813. The gate signals 443 and 444 are also fed to the AND gates 811 and 813, respectively, and the input pulses of the transistors 820 and 821 are the pulse width modulated sine wave as shown in FIG. 10.

Figure 11:
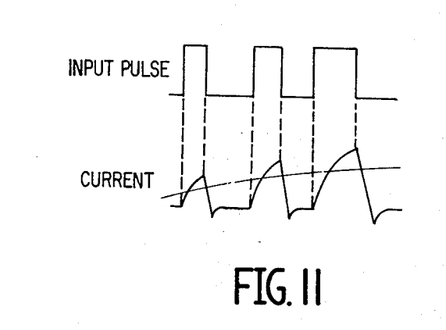

Referring now to FIG. 11, it is seen that each input pulse to the transistor 820 will turn the same on, and current will flow therethrough and the winding $18_1$ with a certain time constant, and when the input pulse falls the transistor 820 will turn off. In this manner, the mean current flowing through the winding $18_1$ will take a sine wave form.

Figure 12:
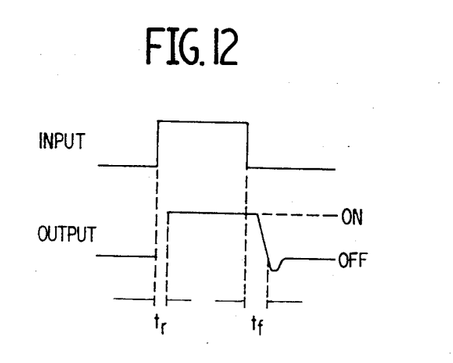

In this embodiment, the distortion of the sine wave flowing through the winding $18_1$ must be a minimum. However, pulse amplifying by a power transistor is considerably difficult, because a power transistor is usually used as a low frequency amplifier. The switching operation of a power transistor is as shown in FIG. 12, and the rise time $t_r$ and the fall time $t_f$ is decided in accordance with the construction of the transistor.

Figure 13:
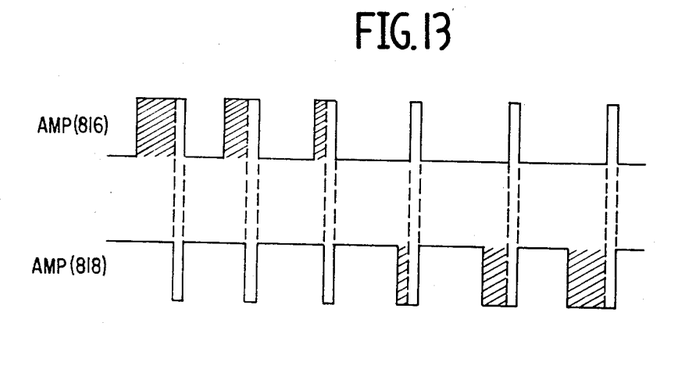

In order to eliminate the above defect, one of the transistors 820 and 821 is switched on by the PWM signals 828, while the other is switched on by correction pulses whose width is very narrow, such as having a fall time $t_f$ whose fall is timed to be equal to that of one of the transistors, as shown in FIG. 13.

Then, during the overlap time of the PWM signal and the correction pulse, the current flows through the transistors 820 and 821, and not through the winding $18_1$. In this manner, any distortion by the fall time $t_f$ can be effectively reduced.

The correction pulse can be made as follows. In FIG. 8, the memory 809 memorizes the constant value which designates the pulse width of the correction pulse. Now in this embodiment, the constant value is 1. The content of the subtract counter 803 is subtracted, and when it becomes 1, the coincidence circuit 810 transmits a coincidence signal to the flip-flop 808 to thereby set the same. As the flip-flop 808 is reset by the zero signal 806, the output of the flip-flop 808, or the correction pulse 829 becomes as shown in FIG. 9, having a narrow pulse width whose fall is timed to be equal to that of one of the transistors.

It is easily understood that the time of fall of the correction pulse 827 is equal to that of the PWM signal 828. Since the correction pulse 827 is fed to the AND gate 812 and the AND gate 814 through the inverter 826, and since the gate signal 444 is also fed to the AND gate 814, the supplied pulse to the transistors 820 and 821 become as shown in FIG. 13.

Furthermore, harmonics of the current are also generated when the transistor 820 or 821 are switched off. Such harmonics are unpreferable in controlling the servo-motor 18. The harmonics are eliminated by maintaining the current flowing through the winding $18_1$ at a constant value, even if a transistor turns off. As described before, the output of the flip-flop 807 or the PWM signal 828 and the output of the inverter 824 are inverted by the inverter 815 and are fed to the transistors 822 and 823. Thus, if the transistor 820 turns off, the transistor 823 will turn on, and the current flowing through the winding $18_1$ will be maintained and any harmonics are thereby eliminated. Of course, when the transistor 821 turns off, the transistor 822 turns on.

In the above-described embodiment, the instruction pulses 11 are converted to the PWM signal 828 modulated by a sine wave or a cosine wave by pulse width and then the PWM signal 828 is remodulated to a sine or a cosine wave to drive the windings. In this manner, the pulses can be easily amplified and a large power can be obtained.

FIG. 14 shows still one other embodiment of this invention. In this embodiment, means are provided to make a PWM signal which is modulated by a sine wave by a pulse width generated by the function generator 16 in FIG. 1. The sine wave 1401 or the output of the operational amplifier 618 in FIG. 6, and a sawtooth wave 1402 are added by an adder 1403. The added signal is fed to a Schmitt circuit 1404 and also to a Schmitt circuit 1405 through an inverter 1406. It can then be easily understood that a sine wave is modulated by the pulse width and the outputs of the Schmitt circuit 1404 and 1405 become as shown in FIG. 10. The outputs of the Schmitt circuits 1404 and 1405 are amplified by amplifiers 1407 and 1408 and then fed to the transistors 820 and 821 in FIG. 8, and the winding $18_1$ is thereby excited.

In addition, the outputs of the Schmitt circuits 1404 and 1405 are fed to transistors 822 and 823 through an OR gate 1409 and an inverter 1410 to eliminate the harmonics thereof. The sawtooth wave 1402 is fed to a Schmitt circuit 1411 to provide the correction pulse 827 shown in FIG. 8. In this manner, the output of the Schmitt circuit 1411 is fed to the AND gate 812 and to the AND gate 814 through an inverter 1412.

It should now be apparent, as described above, that in accordance with the present invention, a digital servo-mechanism is provided in which a variable frequency power supply is provided by a digital operation. In this manner, the servo-motor can be controlled by a sine wave of variable frequency. Furthermore, a PWM wave of a sine wave can be obtained, and it is possible to employ a large power servo-motor.

Obviously, numerous modifications and variations of the present invention are possible in light of the above teachings. It is therefore to be understood that within the scope of the appended claims the invention may be practiced otherwise than as specifically described herein.

What is claimed is:
1. A digital servo-mechanism comprising:
 a two-phase servo-motor having an excitation and a control winding,
 a position detector for detecting the angular position of said servo-motor and for generating feedback pulses of a number which is proportional to said angular position,
 means for providing instruction pulses for moving said servo-motor by rotating the same through an angle proportional to the number of the instruction pulses, a deviation register to count said feedback pulses and said instruction pulses, a pulse generator for generating reference pulses, a gate circuit to multiply said reference pulses with the content of said deviation register and to generate a successive pulse train, a pulse counter for counting said successive pulse train indicative of the deviation and to convert the deviation to a given frequency, a function generator for generating a sine and a cosine wave according to said frequency, and a power amplifier for amplifying said sine and cosine waves and to drive said exciting and control windings of said servo-motor.

2. A digital servo-mechanism according to claim 1, wherein:

said amplifier has frequency characteristics such that the output voltage thereof increases as the frequency increases.

3. A digital servo-mechanism according to claim 1, wherein:

said sine and cosine waves are added with sawtooth waves to provide pulse width modulation signals, and the PWM signals so provided are amplified to drive the windings of said servo-motor.

4. A digital servo-mechanism comprising:

a two-phase servo-motor having an excitation and a control winding, a position detector for detecting the angular position of said servo-motor and for generating feedback pulses of a number which is proportional to said angular position, means for providing instruction pulses for moving said servo-motor by rotating the same through an angle proportional to the number of the instruction pulses, a deviation register to count said feedback pulses and said instruction pulses, a pulse generator for generating reference pulses, a gate circuit to multiply said reference pulses with the content of said deviation register and to generate a successive pulse train, a pulse counter for counting said successive pulse train indicative of the deviation and to convert the deviation to a given frequency, means to generate a PWM signal according to said frequency, a power amplifier to amplify said PWM signal, and means to drive said windings of said servo-motor by said PWM signal.

5. A digital servo-mechanism according to claim 4, wherein said power amplifier comprises:

a power transistor for amplifying said PWM input signal, a load to be supplied power, a gate connected in parallel to said load, means to provide correction pulses the pulse width of which is nearly equal to the fall time of said power transistor and whose fall time is equal to that of said input signal, and means to open said gate by said correction pulses so that a current will not flow through said load when said correction pulses arrive.

6. A digital servo-mechanism according to claim 4, wherein said power amplifier comprises:

a power transistor to amplify said PWM input signal, a load to be supplied power, a transistor connected in parallel to said load, and means to turn on said transistor by pulses which are provided by inverting said input signal so as to maintain a current flowing through said load even if said power transistor turns off.

7. A digital servo-mechanism according to claim 4, wherein said means for generating a PWM signal comprises:

a fixed memory to memorize an amplitude of a function, means to successively readout the content of said fixed memory in accordance with said reference pulses, a clock oscillator to generate clock pulses the number of which is nearly $2^n$ times that of the reference pulses wherein $n$ is equal to the bit number of said counter, a subtraction counter which is fed the readout content of said fixed memory and which subtracts said clock pulses from its content and transmits a zero signal when its content becomes 0, and a flip-flop which is set by said reference pulses and is reset by said zero signal to generate said PWM signal.

* * * * *